Patented Oct. 24, 1933

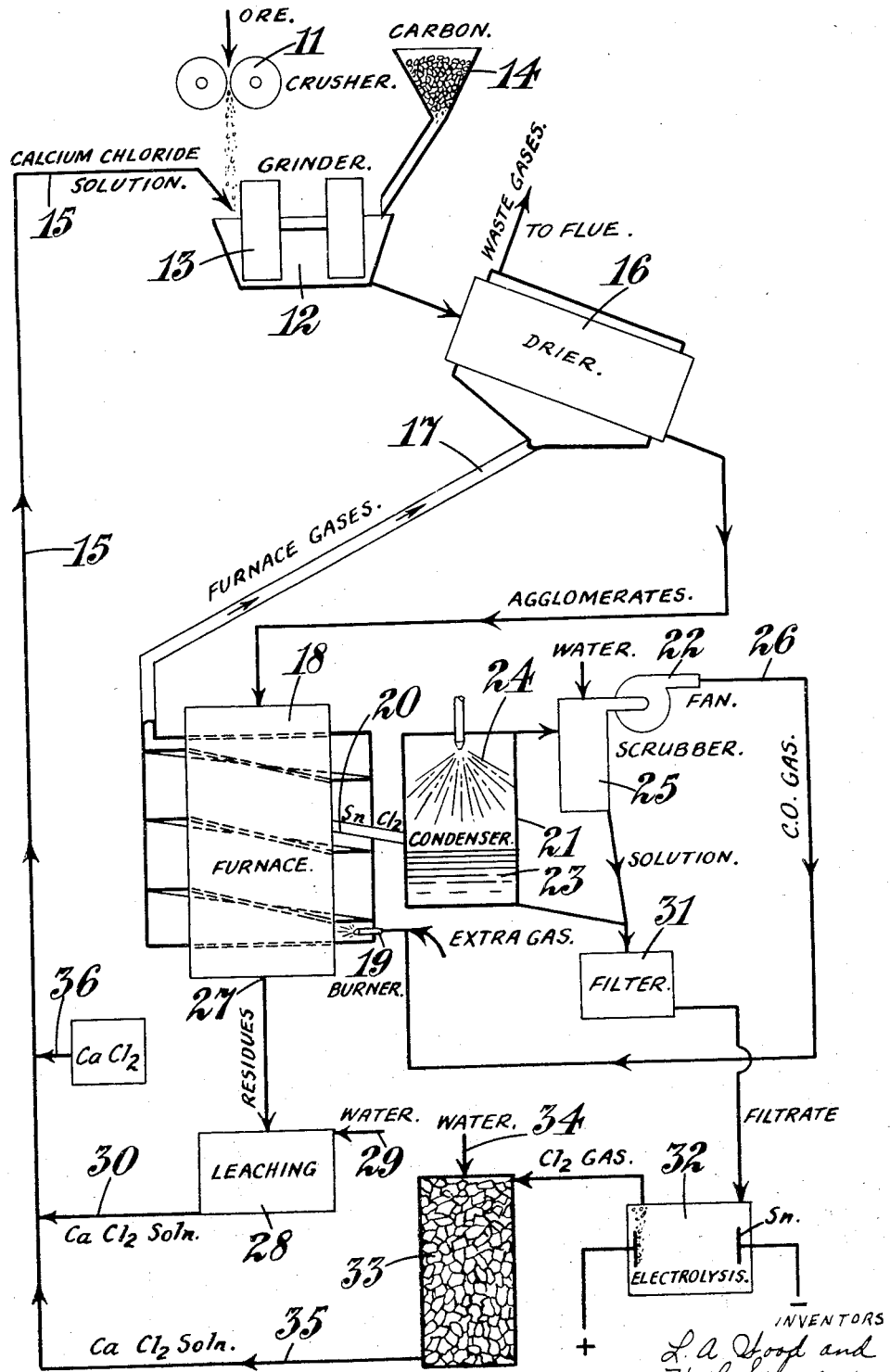

1,931,944

UNITED STATES PATENT OFFICE 1,931,944

EXTRACTION OF TIN FROM ORES

Louis Albert Wood and Henry Livingstone Sulman, London, England

Application August 8, 1932, Serial No. 627,944, and in Great Britain June 15, 1932

10 Claims. (Cl. 23—98)

This invention comprises improvements in or relating to the extraction of tin from ores including under that term concentrates and the like. The invention relates to processes of the type in which tin-bearing ores mixed with carbonaceous matter are heated in the presence of a halogen salt out of substantial contact with air so as to form stannous chloride which distills from the ores and is condensed.

According to the present invention a process for the extraction of tin from ores by chloridization in the presence of carbon is characterized by the fact that the chloridizing agent consists of calcium chloride solution admixed with the ore, which solution acts as a binder to prevent dusting of the charge. It has been found that calcium chloride solution, although giving up its water of hydration gradually while it is heated, acts as a very effective binding agent to hold together the ore with which it is mixed and prevent losses by dusting in the furnace, because at the lower temperatures it is liquid through the presence of water and at the higher temperatures it is liquid through being fused.

Preferably the ore and carbon are mixed or ground together in admixture with a calcium chloride solution to the form of damp or wet sand. The wet mixture may be introduced into a drying chamber and therein heated to such a temperature as to remove excess water while being agitated to form agglomerates which are not liable to produce dust when subsequently heated to the reaction temperature.

The process can, in view of the fact that the material is not liable to produce undue quantities of dust, be carried out readily as a continuous process in a muffle furnace of the type through which the ore is worked continuously by moving parts of the furnace itself.

The invention will now be described with reference to the accompanying drawing, which constitutes a diagrammatic flow sheet showing one form of process according to the invention by way of example.

Tin ore is fed through a crushing plant diagrammatically indicated at 11, the plant being such that the product will pass a screen having about four meshes to the lineal inch. The ore is then introduced into a grinder 12 shown as being of the roller-and-pan type having a pan 12 and rollers 13. From a hopper 14 carbonaceous material such as crushed coal is also fed into the grinder 12 and the whole is moistened by calcium chloride solution 15. The mixture is ground together to the consistency of wet sand.

A desirable proportion of calcium chloride (reckoned as 100% CaCl₂) is roughly about one and one-half times the theoretical quantity indicated by the equation

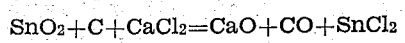
$$SnO_2 + C + CaCl_2 = CaO + CO + SnCl_2$$

Thus an ore carrying 4% of tin will require about 6% CaCl₂. In our trials on basic ferruginous cassiterite ores carrying 4.3% Sn, 7½% of 90% CaCl₂ has commonly been used, and for 7.7% Sn ore, 13% of this salt.

The total quantity of carbon should be in excess of that required to reduce all metals present to the metallic state and it is found that this quantity of carbon eliminates any tendency to fusion or incipient fusion in the course of the process.

The damp sandy mixture is then introduced into a suitable drier 16 such as a rotating inclined tubular furnace heated by the waste gases 17 from the furnace hereinabove referred to. In the drying furnace the material tends to agglomerate into small aggregates, which are held together by the calcium chloride as a binder and which are, therefore, not liable to produce undue quantities of dust. From the drier the mixture is fed to the hearth of the furnace 18.

The furnace 18 is muffle-heated, for example by producer gases, introduced at burner 19, and in it the ore-mixture is raised to a temperature of the order of 800 to 900° C. It is found that all tendency to "fritting", that is fusion or incipient fusion of the material when raised to this high temperature in the furnace 18, is obviated by the presence of a suitable quantity of carbon as hereinabove described. The hearth or hearths are operated by the usual rabbles for causing ore to travel gradually through the furnace. Stannous chloride is evolved and drawn off at 20 and condensed in condenser 21. There is an outlet 27 for ore residues.

It is important to prevent contact between metallic iron components of the apparatus and stannous chloride condensations. That is to say, such iron components must be kept at a temperature above the volatilization point of tin chloride. In the body of the furnace 18 itself, where the temperature is above the distillation temperature of stannous chloride, the employment of iron is permissible. In the condensing portion of the apparatus, however, it is preferable that fused silica be employed in the hotter portions and enamelled or other vitreous material in the cooler portions.

The furnace and the condensing apparatus are maintained at a pressure below that existing outside the muffle hearth, conveniently, by means of an exhaust fan 22, so that all tendency of stannous chloride to leak outwardly is avoided. This precaution is particularly beneficial because any vapours which might leak through cracks in the apparatus would in practice be lost. Moreover, if any of the retort materials are of a pervious character a minus pressure outside the hearth chamber tends to prevent absorption of stannous chloride vapours thereby.

Due to its high vapour density and high boiling point, stannous chloride readily condenses to the liquid form, i. e. at 606° C. and will therefore collect in quantity in any leading-out tube such as 20 which falls below this temperature. It is therefore advisable to avoid long horizontal lengths of piping and even sloping tubes or pipes must be kept at a temperature above the solidifying point of stannous chloride, viz. 250° C.

The condenser 21 may consist of a chamber with non-pervious walls, fitted with water-spray 24 or steam inlets, to dissolve the stannous chloride which collects as a solution 23. It is followed by a scrubbing tower 25 in which the final traces of tin chloride suspended in the permanent gases, are arrested. The effluent scrubbed gases 26 consist largely of carbon monoxide and can be used for supplying the gas burners 19 in the muffle-heated furnace.

The ore residues discharged from the furnace 18 at 27 are taken to a leaching plant 28 and leached with water 29 which effects a substantial recovery of excess calcium chloride and the calcium chloride solution thus produced is led, as shown at 30, to join the calcium chloride solution supply 15 for use in the grinder 12.

The stannous chloride solution recovered from the condenser 21 and scrubber 25 is delivered to a filter 31 and the clear filtered solution is taken to electrolytic apparatus 32 where crystals of pure tin are obtained at the cathode and chlorine gas at the anode. The chlorine gas is collected and passed through a tower 33 packed with limestone and wetted with water 34. As a result calcium chloride solution 35 is recovered and led back as shown at 15 to the ginder 12. Additional calcium chloride solution beyond that supplied at 30 and 35 can be added at 36 for make-up purposes.

Instead of recovering the tin by electrolysis stannous chloride crystals can be recovered from the effluent filter 31 by evaporation. Instead of leading the chlorine gas into a tower 33 packed with lime it can be mixed with a hydrogenous reducing gas, such as coal gas, water gas or producer gas, and the mixture can be passed through a zone packed with a contact agent, such as firebrick heated to redness. As a consequence hydrochloric acid is formed and can be condensed in water so that the whole of the chlorine may be recovered as hydrochloric acid.

We claim:—

1. A process for the extraction of tin from ores comprising in combination the steps of admixing the ore with carbonaceous material and calcium chloride solution, whereby the calcium chloride solution acts as a chloridizing agent and also as a binder, and thereafter heating the mixture to effect distillation of the tin as chloride.

2. A process for the extraction of tin from ores comprising in combination the steps of admixing the ore with carbonaceous material and calcium chloride solution to the form of damp or wet sand and thereafter heating the mixture to distil the tin therefrom as chloride.

3. A process for the extraction of tin from ores comprising in combination the steps of admixing the ore with carbonaceous material and calcium chloride solution to the form of damp or wet sand, drying the mixture to remove free water and thereafter heating the mixture to distil the tin therefrom as chloride.

4. A process for the extraction of tin from ores comprising in combination the steps of admixing the ore with carbonaceous material and calcium chloride solution to the form of damp or wet sand, granulating the mixture by drying it to the point of removal of free water while effecting agitation to form agglomerated masses, and thereafter heating the mixture to distil the tin therefrom as chloride.

5. A process for the extraction of tin from ores comprising in combination the steps of admixing the ore with carbonaceous material and calcium chloride solution to the form of damp or wet sand, introducing the mixture into a rotatable drying chamber so as to form agglomerated dry masses by rolling and to remove free water, and thereafter heating the mixture to distil the tin therefrom as chloride.

6. A process for the extraction of tin from ores comprising in combination the steps of admixing the ore with carbonaceous material and calcium chloride solution whereby the calcium chloride solution acts as a chloridizing agent and also as a binder, and thereafter heating the mixture in a muffle-heated hearth to effect distillation of the tin as chloride.

7. A process for the extraction of tin from ores comprising in combination the steps of admixing the ore with carbonaceous material and calcium chloride solution whereby the calcium chloride solution acts as a chloridizing agent and also as a binder, and thereafter heating the mixture in a muffle-heated hearth while rabbling it, to effect distillation of the tin as chloride.

8. A process for the extraction of tin from ores comprising in combination the steps of admixing the ore with carbonaceous material and calcium chloride solution to the form of damp or wet sand and thereafter heating the mixture in a muffle-heated hearth while rabbling it, to distill the tin therefrom as chloride.

9. A process for the extraction of tin from ores comprising in combination the steps of admixing the ore with carbonaceous material and calcium chloride solution to the form of damp or wet sand, granulating the mixture by drying it to the point of removal of free water while effecting agitation to form agglomerated masses and thereafter heating the mixture in a muffle heated hearth while rabbling it, to distill the tin therefrom as chloride.

10. A process for the extraction of tin from ores comprising in combination the steps of admixing the ore with carbonaceous material and calcium chloride solution to the form of damp or wet sand, introducing the mixture into a rotatable drying chamber so as to form agglomerated dry masses by rolling and to remove free water, and thereafter heating the mixture in a muffle-heated hearth while rabbling it, to distill the tin therefrom as chloride.

LOUIS ALBERT WOOD.
HENRY LIVINGSTONE SULMAN.